United States Patent
Kojima et al.

(10) Patent No.: US 6,759,759 B2
(45) Date of Patent: Jul. 6, 2004

(54) ROTARY CONTACTLESS CONNECTOR AND NON-ROTARY CONTACTLESS CONNECTOR

(75) Inventors: Tetsuya Kojima, Nagano-ken (JP); Akifumi Arai, Nagano-ken (JP); Hiroyuki Koitabashi, Aichi-ken (JP)

(73) Assignees: Tamagawa Seiki Kabushiki Kaisha, Nagano-ken (JP); Chubu Maruko Co., Ltd., Aichi-ken (JP)

( * ) Notice: Subject to any disclaimer, the term of this patent is extended or adjusted under 35 U.S.C. 154(b) by 72 days.

(21) Appl. No.: 09/935,710

(22) Filed: Aug. 24, 2001

(65) Prior Publication Data

US 2004/0012471 A1 Jan. 22, 2004

(30) Foreign Application Priority Data

Aug. 29, 2000 (JP) ........................................ 2000-259051
Mar. 16, 2001 (JP) ........................................ 2001-076684

(51) Int. Cl.[7] ................................................. B60L 1/00
(52) U.S. Cl. ........................ 307/10.1; 307/9.1; 307/104; 439/15
(58) Field of Search ........................ 307/104, 9.1, 10.1; 439/15, 164; 385/25; 250/227.24

(56) References Cited

U.S. PATENT DOCUMENTS 5,031,992 A * 7/1991 Corcoran ................. 350/96.18
5,331,354 A * 7/1994 Koyama et al. ............ 348/730
5,521,444 A * 5/1996 Foreman ..................... 307/104
5,811,898 A * 9/1998 Everingham ................. 310/36

FOREIGN PATENT DOCUMENTS

JP 222489 * 8/1995 ............ H04B/9/00

* cited by examiner

Primary Examiner—Robert DeBeradinis
(74) Attorney, Agent, or Firm—Sughrue Mion, PLLC (57) ABSTRACT

A rotary contactless connector and a non-rotary contactless connector enable data transmission in a contactless mode by optical elements by combining a rotary transformer or a stationary transformer and a means for coupling the optical elements, and providing a power system with or without a buffer feature by a storage means to receive supplied electric power. The rotary contactless connector has a rotary transformer (1), a light emitting element (8) or a light receiving element provided in the rotor (3), and a stationary light emitting element or light receiving element (11). Data is transmitted between the light emitting element (8) and the light receiving element (11) while supplying electric power to the rotor (3) through the intermediary of the rotary transformer (1). The power output of the rotary transformer (1) is divided into two outputs, one (1a) being directly connected to an electric circuit (9), while the other (1b) being connected to the electric circuit (9) through the intermediary of a storage means (12).

3 Claims, 8 Drawing Sheets

ROTARY CONTACTLESS CONNECTOR AND NON-ROTARY CONTACTLESS CONNECTOR

BACKGROUND OF THE INVENTION

1. Field of the Invention

The present invention relates to a rotary contactless connector and a non-rotary contactless connector. More particularly, the present invention relates to a novel improvement for implementing contactless optical communication type single-channel or multi-channel signal transmission by using the rotary contactless connector and the non-rotary contactless connector. In the case of the rotary contactless connector, a rotor of a rotary transformer is equipped with a rotating-side light emitting or light receiving element, and electric power from an external source is supplied through the intermediary of the rotary transformer to an electric circuit for driving and controlling the rotating-side light emitting element or light receiving element. In the case of the non-rotary contactless connector, the electric power from an external source is supplied through the intermediary of a transformer to an electric circuit for driving a light emitting element or a light receiving element at a power-supplied side.

2. Description of the Related Art

Hitherto, signal transmission between a stationary-side unit and a rotating-side unit has been effected by connecting, for example, a rotating-side unit mounted on a gimbal mechanism having a plurality of rotating shafts or a single-shaft rotating platform and a stationary-side unit by using a rotary joint or slip ring and a contact connection type connector, and eventually by direct coupling to the contact connection type connector.

Great efforts have been made to obviate the need for the use of wiring, and the contactless type data transfer has become significantly easier owing to the progress in the recent infrared communication technology. However, it has been difficult to achieve supply of electric power from a stationary unit to a rotating unit in a contactless mode, and the need for the wire for supplying power still remains, making it difficult to completely eliminate wiring. Furthermore, contactless type data transfer using an optical connector or optical coupler that combines a light emitting member and a light receiving member has also been having a similar difficulty.

The conventional transmission of signals between a stationary unit and a rotating unit described above has been presenting the following problems.

Specifically, the connection method based on a contact type connector and the direct coupling wiring method for connecting a stationary unit and a rotating unit inevitably produce parasite drag generated due to the twist or rigidity of wiring even when only rotary motion of a finite angle is involved.

The rotary joint or slip ring method has been posing such problems as larger sizes, higher cost, and lower environmental resistance although it has less likelihood of the occurrence of the parasite drag attributable to the twist or rigidity of wiring.

Furthermore, use of a modulation type infrared communication device for transmitting a required quantity of data to be transmitted or received by multiple channels would lead to a lower data transmission rate with resultant reduced transmission capacity and higher cost. Inevitably using a non-modulation method to avoid the above-mentioned problem, in turn, has been posing the problem of interference among channels.

SUMMARY OF THE INVENTION

The present invention has been made with a view toward solving the above problems, and it is an object of the present invention to provide a rotary contactless connector and non-rotary contactless connector adapted to perform optical communication type single- or multi-channel signal transmission in a contactless condition.

In the rotary contactless connector for signal transfer between a stationary unit and a rotating unit, a rotating-side light emitting element or light receiving element is mounted on a rotor or a connected member with its rotor to construct a data communication system for transmitting or receiving signals to or from the rotating unit. An electric power is supplied from the stationary unit through the intermediary of the rotary transformer.

For the non-rotary contactless connector to transfer signals between two faced units that are not in contact and whose relative faced positions remain unchanged, a light emitting element (or a light receiving element) is mounted on one of the two units or their connecting members, and a light receiving element (or a light emitting element) is mounted on the other of the two units or its connected members such that they oppose each other, thereby making up a data communication system to transfer signals between two units. For a power system, a transformer that has an extremely small gap between the two non-contacting units is formed to supply electric power from one to the other.

According to one aspect of the present invention, there is provided a rotary contactless connector including a rotary transformer composed of a rotor that has a rotary transformer winding and an annular stator that is concentric with the rotor and has a stator transformer winding, a rotating-side light emitting element or rotating-side light receiving element provided on the rotor, and a stationary-side light emitting element or a stationary-side light receiving element that is fixedly disposed to oppose the rotating-side light emitting element or the rotating-side light receiving element, wherein electric power is supplied to the rotor through the rotary transformer.

Preferably, a nonmagnetic and non-magnetized bearing is provided between the rotor and the annular stator.

Preferably, an electric circuit for driving the rotating-side light emitting element or the rotating-side light receiving element is provided, and electric power is supplied to the electric circuit through the rotary transformer.

Preferably, the rotating-side light emitting element or the rotating-side light receiving element is provided at the central position of the rotor.

Preferably, a plurality of the rotating-side light emitting elements or the rotating-side light receiving elements are provided at the concentric circumferential positions other than the central position of the rotor.

Preferably, a plurality of the rotating-side light emitting elements or the rotating-side light receiving elements are provided in the radial direction of the rotor.

Preferably, the electric circuit is provided in the rotor.

To perform optical communication, a power output of the rotary transformer is divided into two outputs, one being directly coupled to the electric circuit, while the other being coupled to the electric circuit through the intermediary of storage means composed of a capacitor or a storage cell.

Preferably, the intermediary of storage means or the directly coupling line can be obviated with the specific requirement for electric power.

According to another aspect of the present invention, a non-rotary contactless connector is provided composing of two stationary members. These stationary members have the similar components except the electric parts between the transformer output and the electric circuit as below. One stationary member is the supplied side of the electric power by the name of first. The other stationary member is the supplying side of the electric power by the name of second. These stationary members each have a transformer winding, respectively. The transformer winding of the first stationary member is disposed to face with the transformer winding of the second stationary member for making up magnetic path. The electric power is supplied from the second to the first by means of a transformer.

These stationary members have optical-electric elements, respectively. The optical-electric elements of a first stationary member are disposed to oppose to the optical-electric elements of a second stationary member for an optical communication. The optical-electric element is composed of light emitting elements or light receiving elements. An optical communication is performed between the first and second by means of the optical-electric elements. The electric power for driving the optical-electric elements on the first stationary member is supplied through the electric circuit from a first transformer output. The electric power to optical-electric elements on the second stationary member is supplied from an outside power unit.

Preferably, a power output end of the first transformer winding is divided into two outputs, one being directly coupled to the electric circuit, while the other being coupled to the electric circuit through the intermediary of storage means composed of a capacitor or a storage cell.

Preferably, the intermediary of storage means or the directly coupling line can be obviated with the specific requirement for electric power.

DESCRIPTION OF THE PREFERRED EMBODIMENTS

Preferred embodiments of a rotary contactless connector and non-rotary contactless connector in accordance with the present invention will be described in conjunction with the accompanying drawings.

Referring to FIG. 1 through FIG. 4, reference numeral 1 denotes a rotary transformer acting as a contactless power supplying unit. The rotary transformer 1 is comprised of a hollow (or solid) rotor 3 having a transformer rotor-side winding 2, and an annular stator 5 that is provided concentrically with the rotor 3 and around the outer periphery of the rotor 3 and has a transformer stator-side winding 4.

A nonmagnetic and non-magnetized bearing 6 formed of a plastics or the like is provided on the inner wall of the annular stator 5. The nonmagnetic and non-magnetized bearing 6 is disposed between the annular stator 5 and the rotor 3. If the bearing 6 is not used, then it is possible to connect the rotor 3 to a rotating member of an apparatus and connect the annular stator 5 to a stationary member of the apparatus, thereby to put the rotor 3 and the annular stator 5 in order.

One or a plurality of light emitting elements 8 (or light receiving elements) of a rotating assembly are provided on a mounting plate 7. The mounting plate 7 is provided on the orthogonal surface of the rotor 3 to the axial direction of the rotating shaft of the rotor 3. An electric circuit 9 for driving the light emitting element (or receiving elements) 8 on the rotating assembly is mounted on the rotor 3, and the electric power can be supplied from outside via the rotary transformer 1. The electric circuit 9 may alternatively be provided on a rotating member other than the rotor 3. It is needless to say that the electric power supplied via the rotary transformer 1 can be supplied to other general circuits (not shown) in addition to the light emitting elements and light receiving elements.

A stationary member 10 is provided on the surface of the annular stator 5 such that it opposes the rotor 3. Inside the stationary member 10, one or a plurality of stationary-side light receiving elements (or light emitting elements) 11 are provided to correspond to the rotating-side light emitting elements 8. The stationary member 10 can be secured to the annular stator 5 or attached to a stationary unit of an apparatus (not shown).

In the above status, when electric power is supplied from outside to the electric circuit 9 through the intermediary of the rotary transformer 1. The electric circuit 9 receives data sent from an apparatus in a rotary unit. When the electric circuit 9 sends the emitting signals to the rotating-side light emitting elements 8, the rotating-side light emitting elements 8 emit light corresponding to the drive data signals, and the emitted light is received by the stationary-side light receiving elements 11. Thus, the data is transmitted from the rotating-side light emitting elements 8 to the stationary-side light receiving elements 11 by the optical communication method, allowing the contactless system to accomplish the same operation performed by a mechanical connector or slip ring. The dispositional relationship between the rotating-side light emitting elements 8 and the stationary-side light receiving elements 11 can be reversed, as previously mentioned.

Figure 5:
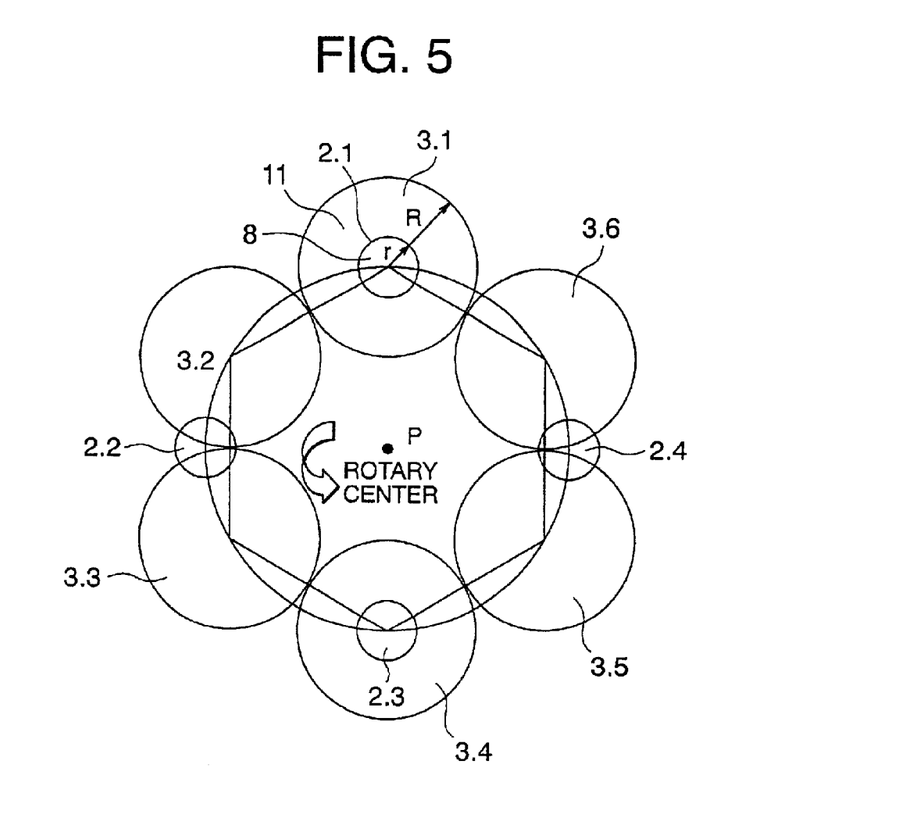
FIG. 5 is a diagram showing a light receiving range and an output range of a light emitting element at the stationary-side light receiving element surface of the rotary-side shown in FIG. 1.
Figure 6:
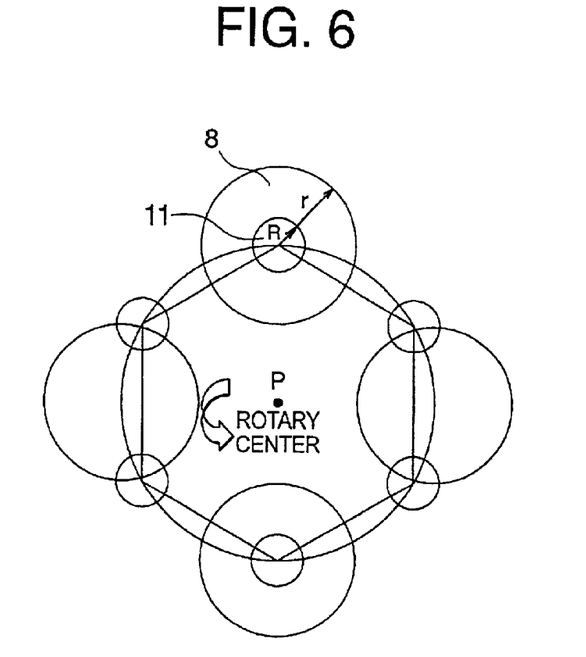
FIG. 6 is a diagram showing a configuration applied when r>R in the diagram shown in FIG. 5.
Figure 9:
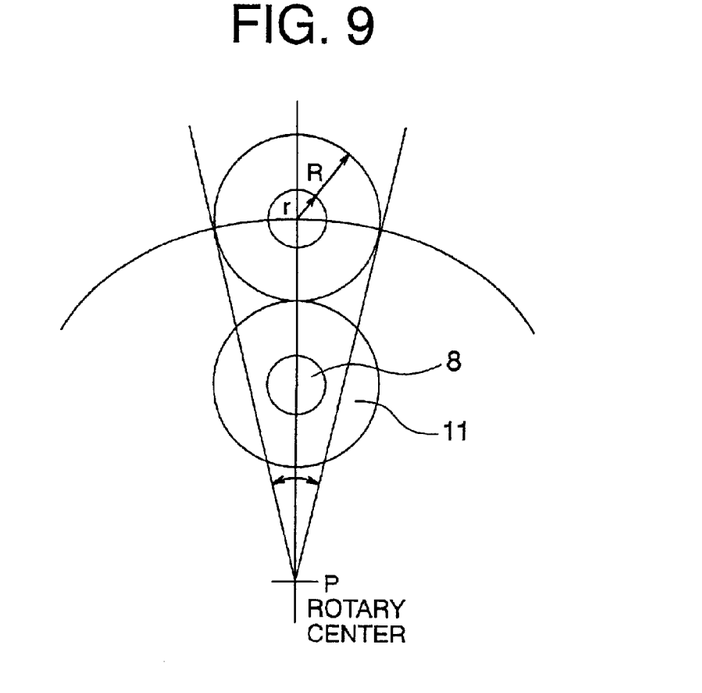
FIG. 9 illustrates an example of the disposition of a light receiving element when a light emitting element is concentrically disposed.

FIG. 5 through FIG. 9 illustrate the relationship between the output range (denoted by r) of the rotating-side light emitting elements 8 and the light receiving range (denoted by R) of the stationary-side light receiving elements 11. It is possible to provide one element 8 and one element 11 at a central position to handle one channel. As shown in FIG. 5 and FIG. 6, however, if four rotating-side light emitting elements 8 and six stationary-side light receiving elements 11 are provided at concentric circumferential positions other than the central position, then it is also possible to provide a plurality of the elements 8 and 11 in the radial direction, as shown in FIG. 9.

In the case shown in FIG. 5, the four rotating-side light emitting elements 8 are set to 2.1, 2.2, 2.3, and 2.4 to assign them to channel 1, channel 2, channel 3, and channel 4, respectively. The output range of light emitting element 8 at the surface of the stationary-side light receiving elements 11 is denoted by a radius "r". Since four-channel outputs are required, it is necessary to provide four rotating-side light emitting elements 8. In order to restrain the occurrence of interruption and interference in receiving data, it is required to provide six stationary-side light receiving elements 11 (3.1, 3.2, 3.3, 3.4, 3.5, and 3.6) of the light receiving radius "R", at the apexes of an equilateral hexagon about a rotational axis. Referring to FIG. 5, when the rotating-side light emitting elements 8, 2.1, starts to enter the circle of the light receiving element 3.2 due to rotation, the rotating-side light emitting element 8, 2.2, which was in the circle of 3.2, will have left the circle by then. The output of the stationary-side light receiving element 11, 3.2, which has been for channel 2 until then, is switched to the output for channel 1 (the rotating-side light emitting element 8, 2.1) by a switching signal from the electric circuit 9. For the remaining channels, the outputs of the light receiving elements are switched in a similar manner in sequence as the rotation is carried out. This allows data communication to be accomplished without interruption or interference in the transfer of the output signals of the channels. FIG. 5 illustrates the example wherein R≧r, since the output range r of the rotating-side light emitting elements 8 is frequently smaller than the input range R of the stationary-side light receiving elements 11. FIG. 6 illustrates a case where r>R. Optical communication can be performed by switching the outputs of the light receiving elements in sequence on the basis of a rotational angle in the similar manner as that described above.

Figure 7:
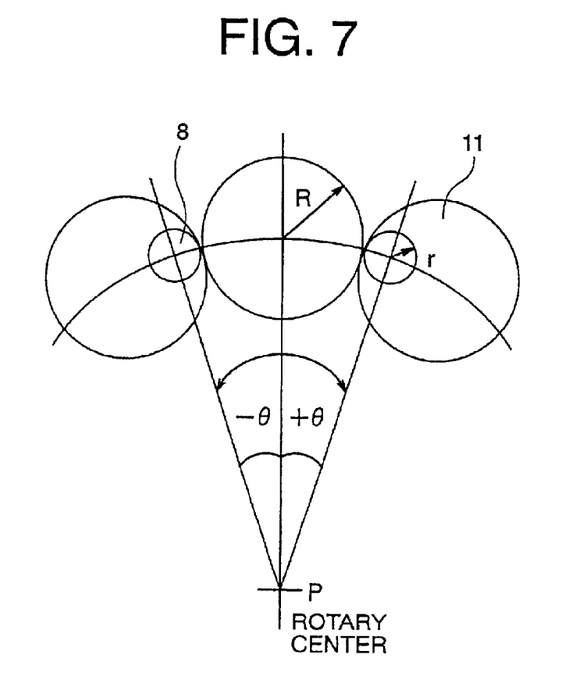
FIG. 7 is a diagram showing a configuration applied when R≧r in the case of a finite rotational angle.

The descriptions will now be given of an embodiment wherein a rotating unit provides 2-channel outputs in the case of a finite-angle rotation. If two channels are on the same circumference, then three stationary-side light receiving elements 11 are installed, and the output of the middle stationary-side light receiving element 11 is switched on the basis of a rotational angle, as shown in FIG. 7, to perform optical communication. The same applies to the case shown in FIG. 8 where r>R.

All the embodiments described above refer to the cases where the rotating-side light emitting elements 8 are installed on the rotating unit, while the stationary-side light receiving elements 11 are installed on the stationary unit. Conversely, if the light receiving elements 11 are installed on the rotating unit, while the light emitting elements 8 are installed on the stationary unit, then the rotating unit and the stationary unit shown in FIG. 8 will be switched and regarded as the stationary unit and the rotating unit, respectively, as previously mentioned. Thus, two-way optical data communication will be possible.

Figure 8:
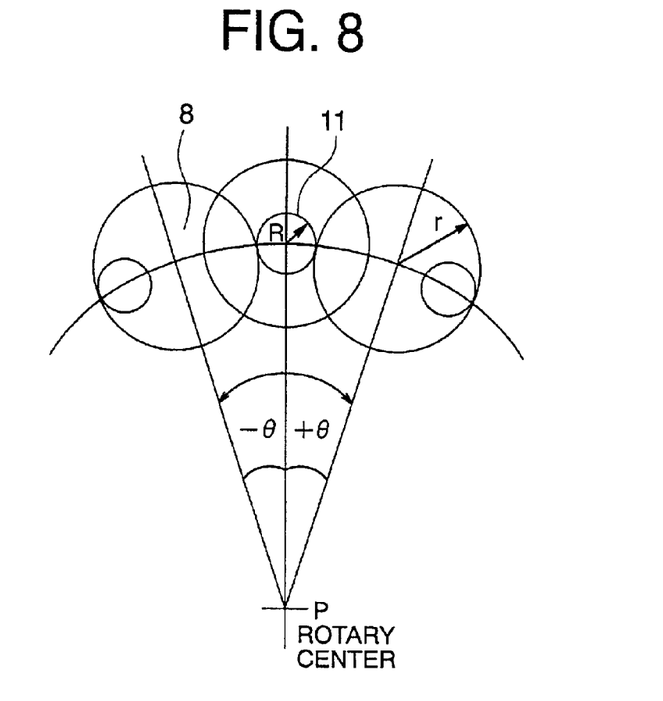
FIG. 8 illustrates an example of the disposition when r>R in FIG. 7 and shows the diagram that a rotary unit is provided with a light receiving element, while a stationary unit is provided with a light emitting element in FIG. 7.

Furthermore, in all the embodiments of FIG. 7 and FIG. 8, the light emitting elements 8 are on the same circumference. Alternatively, however, if the light emitting elements for two channels is installed on two concentric circles, one on each, in the radial direction rather than on the same circumference, two-way, optical data communication will be possible as shown in FIG. 9.

As described above, the optical communication based on the contactless data transmission, including two-way communication, can be achieved by properly disposing the light emitting elements and light receiving elements and appropriately switching the outputs of the optical elements by an electronic switching circuit or the like of the electric circuit 9.

Thus, a rotary contactless connector can be obtained by combining a contactless power supplying unit and a contactless data communication unit.

In the drawing, the stator 5 is positioned around the outer periphery of the rotor 3 to represent a case where the rotor is located inside the stator. There are cases, however, where the rotor is located outside the stator, so that the stator 5 may be positioned on the inner periphery of the rotor 3. These cases are also included in the present invention.

A nonmagnetic and non-magnetized bearing 6 is provided on the inner wall (or the outer wall if the stator 5 is position on the inner periphery of the rotor 3) of the annular stator 5. The nonmagnetic and non-magnetized bearing 6 is disposed between the annular stator 5 and the rotor 3. If the bearing 6 is not used, then it is possible to connect the rotor 3 to a rotating member of an apparatus to which the connector is applied, and connect the annular stator 5 to a stationary member of the apparatus, to which the connector is applied, thereby positioning the rotor 3 and the annular stator 5.

An electric circuit 9 for driving the rotating-side light emitting element (or light receiving elements) 8 is mounted at an end of the rotor 3, and the electric power can be supplied from outside via the rotary transformer 1. The electric circuit 9 may alternatively be provided on a rotating member of the apparatus, to which the connector is applied, other than the rotor 3.

Figure 10:
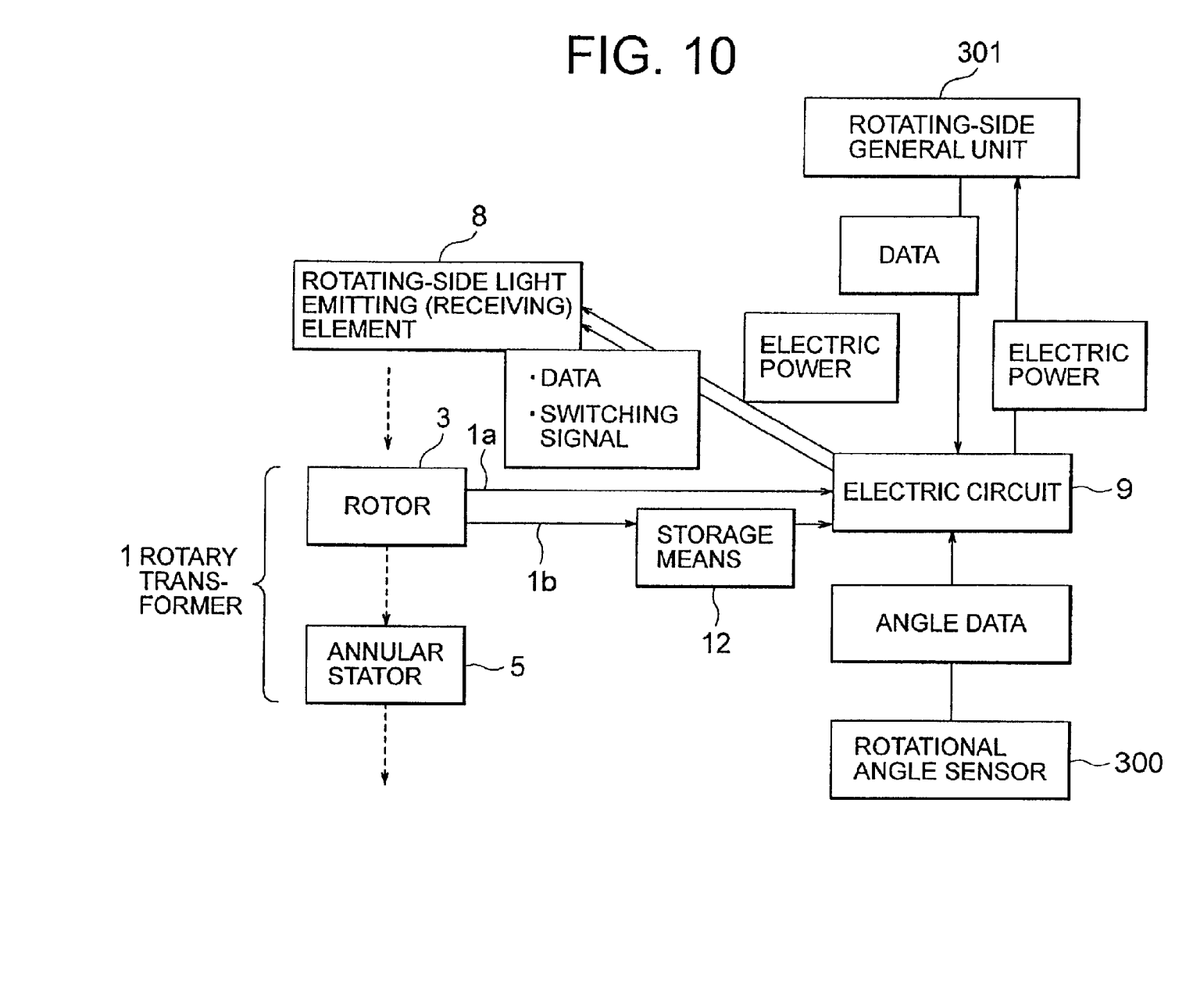
FIG. 10 is a block diagram showing the buffer function of a power system, communication data flow, etc in the present invention.

It is needless to say that the electric power from an external source, which has passed through the rotary transformer 1, is supplied to the electric circuit 9 directly or through the intermediary of a storage means 12, as shown in FIG. 10, and can be supplied to other general unit 301 in addition to the light emitting elements and light receiving elements. The storage means 12 is composed of a capacitor or a storage cell, such as a battery.

Thus, the storage means 12 has a buffer function for a power system. FIG. 10 shows the configuration wherein a rotational angle sensor 300, which may be composed of the light emitting elements 8 and light receiving elements 11 itself, and a rotating-side general unit 301 have been connected to the rotary transformer 1 shown in FIG. 1.

More specifically, the electric power from an external source is supplied to the electric circuit 9 through the intermediary of the storage means 12. The electric power from the storage means 12 can be supplied to the rotating-side light emitting elements 8 and the rotating-side general unit 301 via the electric circuit 9. For this reason, the power output end of the rotary transformer 1 is divided into one end 1a and the other end 1b, and the one end 1a is directly connected to the electric circuit 9, while the other end 1b is connected to the electric circuit 9 through the intermediary of the storage means 12.

Outside the annular stator 5, a stationary member 10 is provided to cover the rotor 3 and the annular stator 5. One or a plurality of light receiving elements 11 (or light emitting elements) of the stationary side are provided at the positions of the stationary member 10 that optically oppose the rotating-side light emitting elements 8 (or light receiving elements). The stationary member 10 may be fixed to the annular stator 5 or mounted on the stationary unit of an apparatus (not shown).

When the external electric power from an external source is supplied to the electric circuit 9 through the intermediary of the rotary transformer 1, the electric circuit 9 receives data sent from an apparatus in a rotary unit. When the electric circuit 9 sends the emitting signals to the rotating-side light emitting elements 8 (hereinafter, the rotating assembly will have the light emitting elements), the rotating-side light emitting elements 8 emit light corresponding to the drive data signals, and the emitted signals are received by the stationary-side light receiving elements 11 (hereinafter, the stationary unit will have the light receiving elements). Thus, the data is transmitted from the rotating-side light emitting elements 8 to the stationary-side light receiving elements 11 by optical communication method, allowing the contactless system to accomplish the same operation performed by a mechanical connector or slip ring. The dispositional relationship between the light emitting elements 8 and the light receiving elements 11 can be reversed, and provided side by side, thus enabling multi-channel bidirectional optical communication to be achieved.

Moreover, the data signals to emit to the rotating-side light emitting elements 8 and to be received by the stationary-side light receiving elements 11 can be taken out electromagnetically to the outside through the intermediary of the transformer rotor winding 2 or the transformer stator winding 4. Thus a multi-channel bidirectional electromagnetical communication may be achieved.

Figure 11:
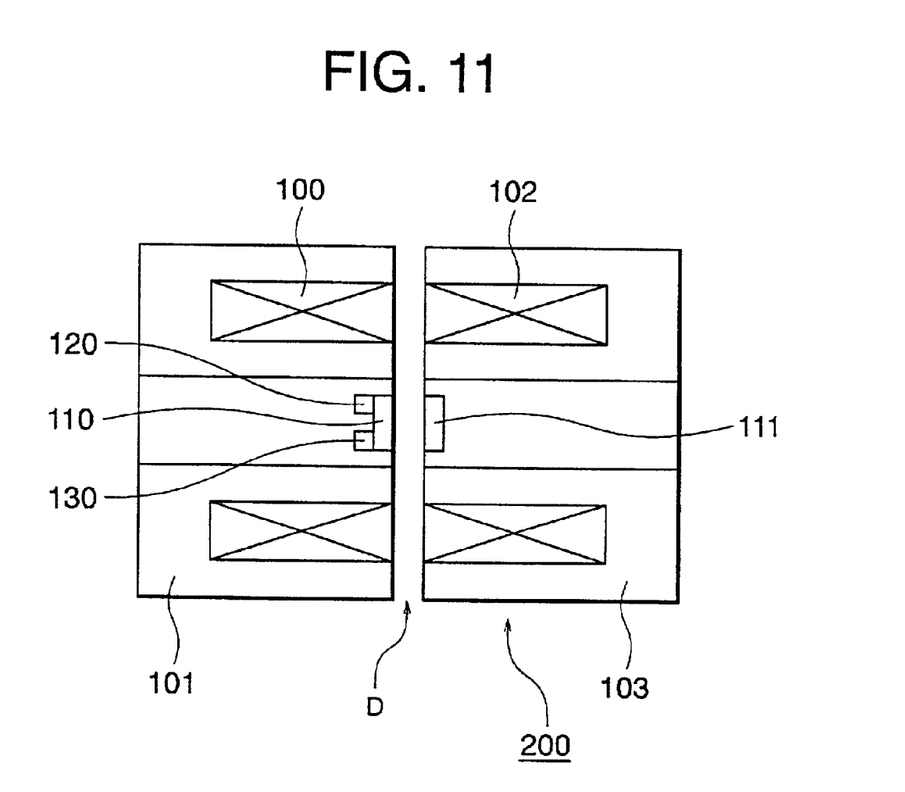
FIG. 11 shows the configuration of a non-rotary contactless connector according to a further embodiment of the present invention.

FIG. 11 shows the configuration of a non-rotary contactless connector according to another embodiment of the present invention.

Figure 1:
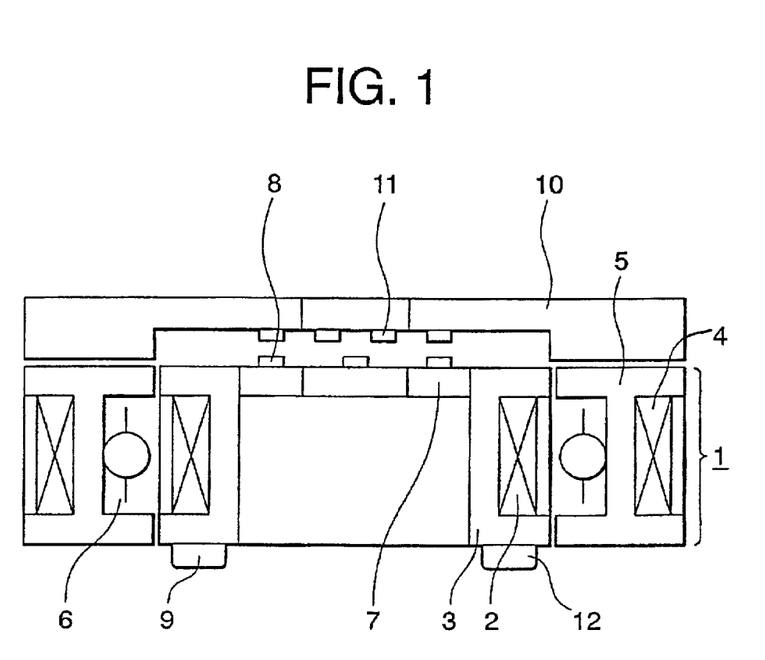
FIG. 1 is a sectional view of a rotary contactless connector according to an embodiment of the present invention.
Figure 2:
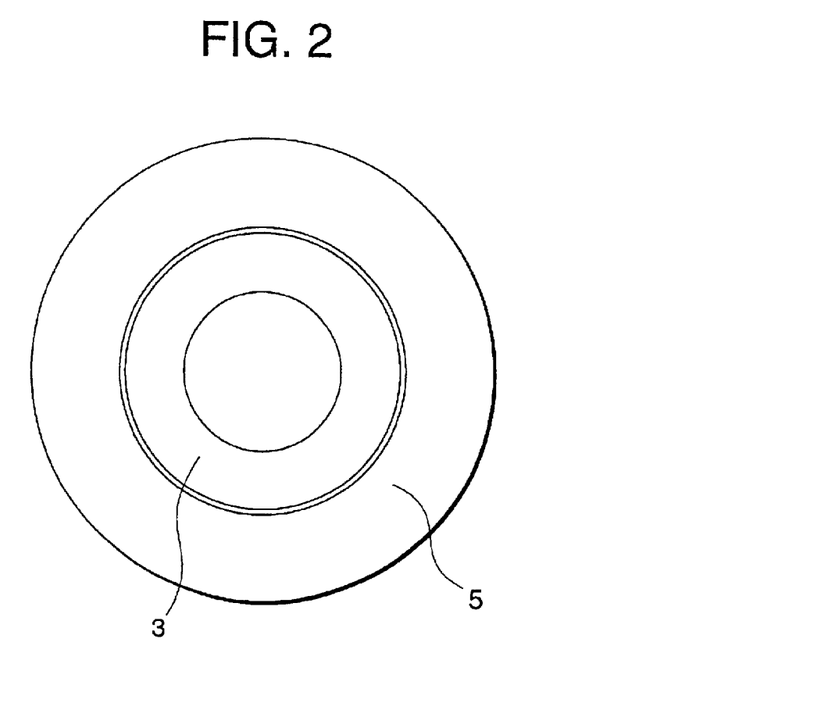
FIG. 2 is a top plan view of an essential section of the rotary contactless connector shown in FIG. 1.
Figure 3:
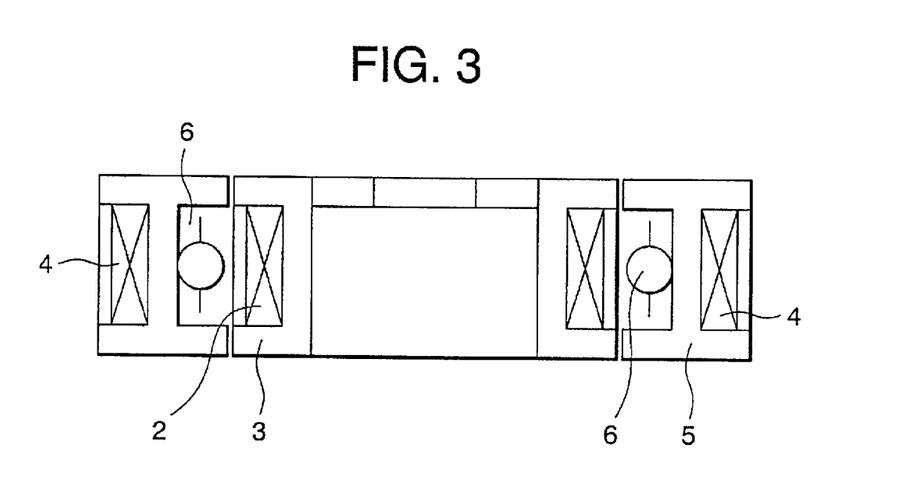
FIG. 3 is a sectional view of the essential section of the rotary contactless connector shown in FIG. 1.
Figure 4:
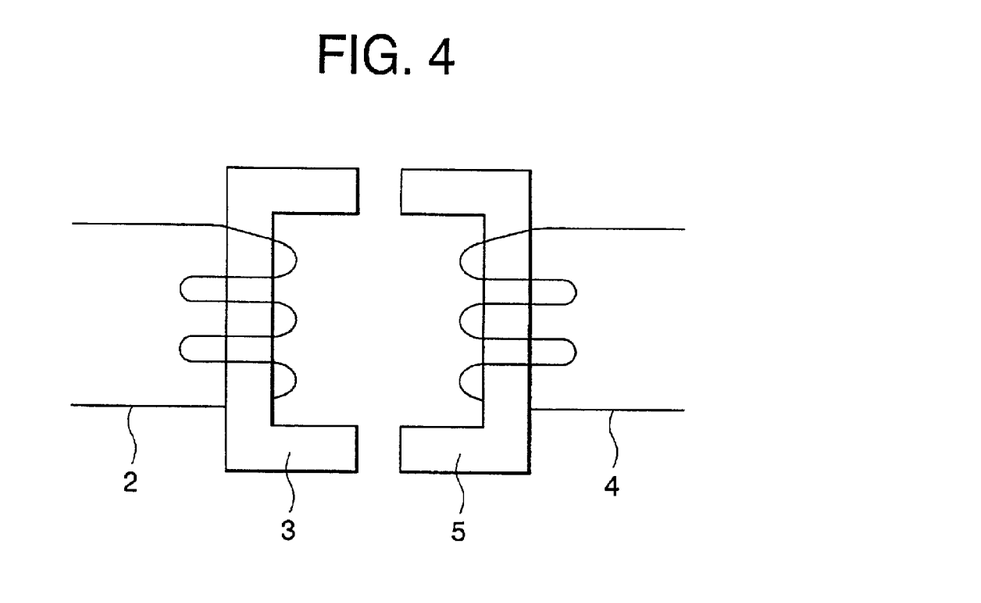
FIG. 4 is a schematic diagram of the essential section of the rotary contactless connector shown in FIG. 1.

If a first stationary member 101 is set as the rotating member in the foregoing rotary contactless connector, while a second stationary member 103 is set as the stationary member in the foregoing rotary contactless connector (the relationship may be reversed), then the gap between the stationary members 101 and 103 corresponds to the gap between the rotor 3 and the annular stator 5 of the foregoing rotary contactless connector shown in FIG. 1.

More specifically, electric power is supplied from the second stationary member 103 to the first stationary member 101, so that the first stationary member 101 is on the power-supplied side. According to this setting, the rotary transformer 1 in the aforesaid rotary contactless connector shown in FIG. 10 corresponds to a stationary transformer 200, and the correspondence of the individual components of the rotating assembly and the stationary unit will be as follows. The foregoing transformer rotor winding 2, which is a component of the rotating assembly, corresponds to a first transformer winding 100, the foregoing rotor 3 and the mounting plate 7 correspond to the first stationary member 101, the foregoing rotating-side light emitting element 8 corresponds to a first light emitting element 110 (here, a first stationary member 101 will have the light emitting elements), the foregoing electric circuit 9 corresponds to an electric circuit 120, and the foregoing storage means 12 composed of a capacitor or a storage cell corresponds to a storage means 130 composed of a capacitor or a storage cell. Similarly, in the stationary unit, the foregoing transformer stator winding 4 corresponds to a second transformer winding 102, the foregoing annular stator 5 and the stationary member 10 correspond to a second stationary member 103, and the foregoing light receiving element 11 on the stationary unit corresponds to a second light receiving element 111 (here, a second stationary member 111 will have the light receiving elements).

It is needless to say, therefore, that the electric power supplied to the electric circuit 120 by making use of the electromagnetic induction between the transformer windings 100 and 102 is supplied to the first light emitting element 110 through wiring (not shown), and can also be supplied to other general devices or the like in the power-supplied unit (not shown) by the electromagnetic coupling previously mentioned.

Furthermore, the signals to emit to the first light emitting element 110 and to be received by the second light receiving element 111 can be taken out electromagnetically to the outside through the transformer winding 100 or 102.

As is obvious from the correspondence of the components mentioned above, the non-rotary contactless connector and the rotary contactless connector basically share the same configuration and function except for the disposition of the light emitting elements and receiving elements for data communication. More specifically, the non-rotary contactless connector has no changes in relative position, so that simply installing it at an opposing position obviates the need for switching. The meaning of the term "contactless" also includes a condition wherein the first stationary member 101 and the second stationary member 103 shown in FIG. 11 are "in contact" on the contactless surface D whereon the first light emitting element 110 and the second light receiving element 111 oppose each other. The designation, non-rotary "contactless" connector implies that the connector is able to function also in the contactless condition.

In both the rotary contactless connector and the non-rotary contactless connector, the configuration of the electric power source depends on a required condition of the electric power to be consumed. To be more specific, whether the configuration in which the electric power going through the intermediary of the rotary transformer 1 in the case of the rotary contactless connector or through the stationary transformer 200 in the case of the non-rotary contactless connector is always supplied directly to the electric circuit 9 or 120, or the configuration in which the electric power is supplied to the electric circuit 9 or 120 always through the intermediary of the storage means should be selected according to a required condition of the electric power to be consumed. Hence, the above configurations are obviously included in the configurations wherein the output power of the rotary transformer or the stationary transformer is supplied to the electric circuit directly and through the intermediary of the storage means.

Figure 12:
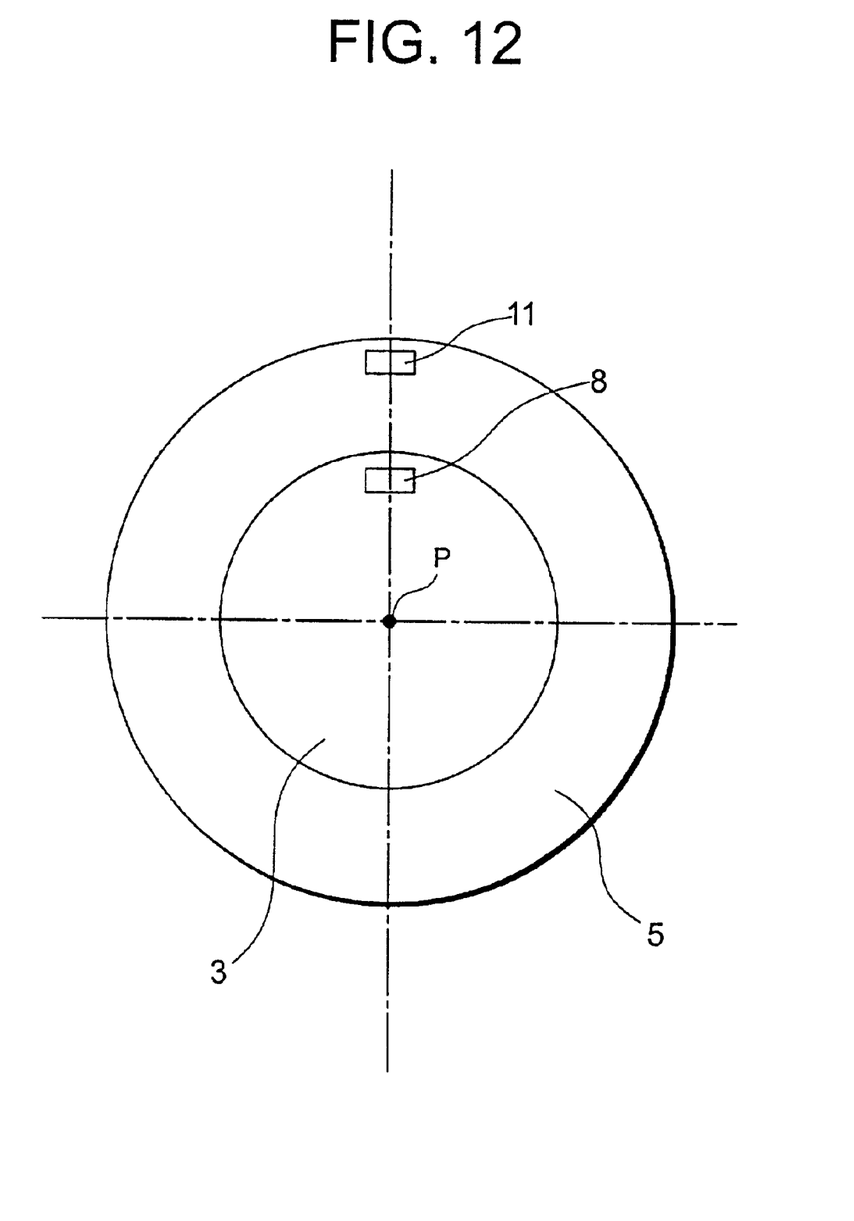
FIG. 12 shows the configuration of still another embodiment of the present invention in FIG. 1.

The descriptions have been given of the electric circuit 9 on the rotating unit in the case of the rotary contactless connector shown in FIG. 1 and FIGS. 2 through 9, and of the electric circuit 120 on the power-supplied unit in the case of the non-rotary contactless connector shown in FIG. 11. It is needless to say that the electric circuit is also provided on the stationary unit in the case of the rotary contactless connector, or on the power-supplying unit in the case of the non-rotary contactless connector, although it is not shown. The functions of the electric circuit on the stationary unit or the power-supplying unit are identical to the functions of the electric circuit 9 or 120 on the rotating unit or the power-supplied unit. To be more specific, the electric circuit functions to supply electric power, generate light emitting commands and light receiving signals, and switch optical elements on the basis of rotational angles (the switching applies only to the rotary contactless connector). However, the functions are not described because the installation place of the electric circuit should not limited to within the connector. Furthermore, for the same reason, the existence of the storage means for the input of the electric circuit on the stationary unit remains optional. In the configurations shown in FIG. 1 through FIG. 11, the communication light between the light emitting elements and the light receiving elements advances in parallel to the axial direction of the rotating shaft. Alternatively, however, to perform communication, the rotating-side light emitting element 8 provided on the rotor 3 and the light receiving element 11 on the stationary unit provided on the annular stator 5 can be positioned on the same plane so that they oppose each other, as shown in FIG. 12, the light path direction of the communication light between the elements 8 and 11 can be made orthogonal to the axial direction of the rotating shaft of the rotor 3.

By virtue of the features described above, the rotary contactless connector in accordance with the present invention provides the following advantages.

The combination of the rotary transformer and the means for coupling optical elements allows data communication between the optical elements in a contactless mode while receiving electric power supplied from an external source. This arrangement makes it possible to transfer data easily and reliably in the contactless mode in detectors, drive units, etc. in various types of apparatuses. In the non-rotary contactless connector, the supply of electric power and the transfer of signals can be accomplished in the contactless mode under a restricted condition.

What is claimed is:

1. A rotary contactless connector comprising:

a rotary transformer composed of a rotor defining a rotary side and having a transformer rotary winding and an annular stator defining a stationary side and being concentric with the rotor and having a transformer stator winding;

a plurality of rotating side elements, comprising at least one of rotating-side light emitting elements or rotating-side light receiving elements, provided on the rotor;

a plurality of stationary side elements, comprising at least one of stationary-side light emitting elements or stationary-side light receiving elements, that are disposed for optical coupling with the rotating-side elements, and a switching circuit disposed on at least one of said stationary side and said rotary side, and being operative to switchably optically couple at least one of said plurality of rotating side elements to at least one of said plurality of stationary side elements, wherein electric power is supplied to the rotor through the rotary transformer to enable optical communication, wherein a plurality of said rotary side elements are arranged along a common circumferential locus and comprise only one of light transmitting or light receiving elements, wherein an output of two light emitting elements does not enter a range of one light receiving element at the same time, and wherein one light emitting element output enters the range of two light receiving elements at the same time, whereby said switching device is controlled to provide continuous optical communication as said rotor is rotated.

2. A rotary contactless connector comprising:

a rotary transformer composed of a rotor defining a rotary side and having a transformer rotary winding and an annular stator defining a stationary side and being concentric with the rotor and having a transformer stator winding;

a plurality of rotating side elements, comprising at least one of rotating-side light emitting elements or rotating-side light receiving elements, provided on the rotor;

a plurality of stationary side elements, comprising at least one of stationary-side light emitting elements or stationary-side light receiving elements, that are disposed for optical coupling with the rotating-side elements, and a switching circuit disposed on at least one of said stationary side and said rotary side, and being operative to switchably optically couple at least one of said plurality of rotating side elements to at least one of said plurality of stationary side elements, wherein electric power is supplied to the rotor through the rotary transformer to enable optical communication wherein, a first plurality of said rotary side elements are arranged along a first common circumferential locus and comprise at least light transmitting elements, and a second plurality of said rotary side elements are arranged along a second common circumferential locus and comprise at least light receiving elements, and wherein said first plurality of rotary side elements and said second plurality of rotary side elements are optically coupled to stationary side elements and are adapted to provide simultaneous bidirectional communication.

3. The rotary contactless connector according to claim 2 wherein said optical coupling between rotary side elements and stationary side elements is a switched coupling.

* * * * *